US012699769B2

(12) United States Patent
Czerninski et al.

(10) Patent No.: US 12,699,769 B2
(45) Date of Patent: Aug. 4, 2026

(54) DYNAMIC RUNTIME MICRO-SEGMENTATION OF INTERPRETED LANGUAGES

(71) Applicant: Oligo Cyber Security LTD., Tel Aviv (IL)

(72) Inventors: Nadav Czerninski, Tel Aviv (IL); Gal Elbaz, Tel Aviv-Jaffa (IL); Avshalom Elchanan Hilu, Tel Aviv (IL)

(73) Assignee: OLIGO CYBER SECURITY LTD., Tel Aviv (IL)

( * ) Notice: Subject to any disclaimer, the term of this patent is extended or adjusted under 35 U.S.C. 154(b) by 458 days.

(21) Appl. No.: 18/203,476

(22) Filed: May 30, 2023

(65) Prior Publication Data

US 2023/0385403 A1      Nov. 30, 2023

Related U.S. Application Data

(60) Provisional application No. 63/347,354, filed on May 31, 2022.

(51) Int. Cl.
| | |
|---|---|
| *G06F 21/54* | (2013.01) |
| *G06F 8/77* | (2018.01) |
| *G06F 11/3604* | (2025.01) |
| *G06F 21/55* | (2013.01) |

(52) U.S. Cl.
CPC ................ *G06F 21/54* (2013.01); *G06F 8/77* (2013.01); *G06F 11/3604* (2013.01); *G06F 21/552* (2013.01); *G06F 21/554* (2013.01)

(58) Field of Classification Search
CPC .......... G06F 21/54; G06F 21/552; G06F 8/77; G06F 11/3604
USPC ......................................................... 717/130
See application file for complete search history.

(56) References Cited

U.S. PATENT DOCUMENTS

| | | | |
|---|---|---|---|
| 9,866,433 B1 * | 1/2018 | Fakhouri ............. | H04L 41/0806 |
| 10,846,197 B1 * | 11/2020 | Bluestein ........... | G06F 11/3624 |
| 2022/0108007 A1 * | 4/2022 | Zatutschne-Marom ..................... | |
| | | | G06F 21/52 |
| 2023/0289460 A1 * | 9/2023 | Gehani ............... | G06F 11/3466 |

* cited by examiner

*Primary Examiner* — Bradford F Wheaton
(74) *Attorney, Agent, or Firm* — Myers Wolin, LLC

(57) ABSTRACT

Execution of a software program that is programmed in an interpreter-based language is monitored. Programs for recording entry and exit points of functions and invocations of system calls are attached to the software program. At least one program is implemented using eBPF. A monitoring agent receives indications of entries and exits to the functions. Based on the indications of entries and exits, the monitoring agent monitors a stack trace of the software program. Based on the indications of system call invocations and based on the stack trace of the software program, the monitoring agent identifies system call invocations by a software library. The monitoring agent performs a responsive action in response to a determination that a system call invocation deviates from a pre-defined policy of authorized functionalities.

19 Claims, 4 Drawing Sheets

DYNAMIC RUNTIME MICRO-SEGMENTATION OF INTERPRETED LANGUAGES

CROSS-REFERENCE TO RELATED APPLICATIONS

This application is a continuation of and claims the benefit of U.S. Provisional Patent Application No. 63/347,354 filed May 31, 2022, titled "DYNAMIC RUNTIME MICRO-SEGMENTATION OF INTERPRETED LANGUAGES", which is hereby incorporated by reference in its entirety without giving rise to disavowment.

TECHNICAL FIELD

The present disclosure relates to cybersecurity, in general, and to runtime monitoring of executed programs, in particular.

BACKGROUND

Cybersecurity is a rapidly evolving field that deals with protecting computer systems, networks, and sensitive information from unauthorized access, use, disclosure, disruption, modification, or destruction. The rise of cyberattacks in recent years has highlighted the need for robust cybersecurity measures to safeguard against potential risks. Some of the risks that cybersecurity attempts to deal with include hacking, malware attacks, phishing, identity theft, and data breaches. These risks can lead to financial losses, reputational damage, and legal liabilities for individuals and organizations.

One of the most significant risks in the cybersecurity landscape is vulnerability exploitation. Vulnerabilities are flaws or weaknesses in computer systems, software, or networks that can be exploited by cybercriminals to gain unauthorized access or control. Threat actors use various techniques to identify and exploit vulnerabilities, including reverse engineering, brute force attacks, and code injection. To protect against vulnerability exploitation, cybersecurity measures such as vulnerability scanning, penetration testing, and patch management are essential.

Open-source libraries are widely used in software development as they offer various benefits such as cost-effectiveness, flexibility, and community support. However, the use of open-source libraries can also pose significant security risks. Open-source libraries may contain vulnerabilities that can be exploited by attackers to compromise the security of the system. Additionally, open-source libraries may have outdated or unsupported versions that can result in security gaps. To mitigate these risks, organizations should adopt best practices such as continuous monitoring, vulnerability management, and secure coding practices when using open-source libraries in their software development processes.

BRIEF SUMMARY

One exemplary embodiment of the disclosed subject matter is a method for monitoring execution of a software program in first process by a host computer, the software program is programmed in an interpreter-based language, the software program incorporates a software library, the host computer is executing an operating system having a kernel and provisioning distinct processing spaces to different executed programs, the method comprising: attaching a first program to one or more entry points of functions of the software library, a second program to one or more exit points of the functions of the software library and a third program to system call invocations by the software program, wherein at least one of the first program, the second program and the third program is implemented using an extended Berkeley Packet Filter (eBPF), whereby the eBPF providing observability in kernel mode of the operating system; receiving, by a monitoring agent, indications of entries and exits to the functions, the monitoring agent is executed in a second process of the host computer, the second process having a separate processing space than the first process; based on the indications of entries and exits, monitoring, by the monitoring agent, a stack trace of the software program, whereby tracking stack state in the separate processing space; based on the indications of system call invocations and based on the stack trace of the software program, identifying, by the monitoring agent, system call invocations by the software library; and performing responsive action in response to a determination that a system call invocation deviates from a pre-defined policy of authorized functionalities.

Optionally, the first program, the second program, and the third program are all implemented using the eBPF, whereby the first program, the second program, and the third program are executed in kernel mode.

Optionally, wherein a portion of the first program, the second program and the third program is implemented without using the eBPF, whereby the portion is used to collect information from user mode, whereby reducing overhead associated with mode switching from kernel mode to user mode or vice versa.

Optionally, the monitoring agent and the software program are programmed using different programming languages.

Optionally, the host computer is part of a container orchestration system, wherein the first process executing the software program is a first container of the container orchestration system, wherein the second process is a second container of the container orchestration system.

Optionally, the host computer executes one or more additional containers, the one or more additional containers are used to execute one or more additional programs, each of the one or more additional programs is attached at runtime with monitoring programs for monitoring entries and exists to functions thereof and to system call invocations therefrom, whereby enabling the monitoring agent to monitor, in a single processing space, a plurality of different stack traces, whereby reducing resource overhead utilized for monitoring stack traces.

Optionally, stable execution of the software program is not compromised in an event of unexpected termination of the monitoring agent, whereby robust execution of the software program is provided while enabling stack trace monitoring thereof.

Optionally, the responsive action comprises preventing the system call invocation, whereby enforcing the pre-defined policy.

Optionally, the responsive action provides a visual display to a user indicating identified security issues associated with a plurality of software libraries including the software library.

Optionally, the pre-defined policy is defined in a function-granularity or in a library-granularity.

Optionally, the pre-defined policy is defined as allowing or prohibiting a function or library to perform any of the following actions: code execution; file access; and network access.

Another exemplary embodiment of the disclosed subject matter is a system comprising: a host computer comprising a processor and a memory, the host computer having an operating system, the operating system having a kernel and configured to provision distinct processing spaces to different executed programs; a function recorder module configured to record entries and exists from functions; a system call recorded module configured to record system call invocations; a dynamic loader module configured to dynamically operatively couple the function recorder module and the system call recorder module to a software program that is executed by a first process by said host computer, the software program is programmed in an interpreter-based language, the software program incorporates a software library, wherein said dynamic loader module is configured to utilize an extended Berkeley Packet Filter (eBPF) for operatively coupling at least one of the function recorder module and the system call recorder module, whereby the eBPF providing observability in kernel mode of the operating system; and a monitoring agent that is configured to be executed by a second process by said host computer, the second process having a separate processing space than the first process, said monitoring agent is configured to obtained recordings of said function recorder module and said system call recorded module, wherein said monitoring agent is configured to invoke a stack builder to build a stack trace of the software program, whereby tracking stack state in the separate processing space; wherein said monitoring agent is configured to perform a responsive action based on the stack trace of the software program.

Optionally, the monitoring agent is configured to receive recordings from a plurality of additional programs that are executed in an additional plurality of processes.

Optionally, the host computer is part of a container orchestration system, wherein the first process executing the software program is a first container of the container orchestration system, wherein the second process is a second container of the container orchestration system.

Optionally, the memory of the host computer retains a pre-defined policy of authorized functionalities of the software library, wherein said monitoring agent is configured to perform the responsive action in view of a deviation of a function included in the software library from the pre-defined policy of authorized functionalities.

Optionally, the responsive action includes preventing execution of a system call in response to an identified unauthorized invocation of the system call.

Optionally, stable execution of the software program is not compromised in an event of unexpected termination of the monitoring agent, whereby robust execution of the software program is provided while enabling stack trace monitoring thereof.

Optionally, the system is programming-language agnostic.

Optionally, the monitoring agent is implemented in a different programming language than the interpreter-based language.

Yet another exemplary embodiment of the disclosed subject matter is a computer program product retaining on a computer readable storage medium, program instructions, which instructions when executed by a processor, cause the processor to perform: attaching to a software program that is executed in a first process, a first program, a second program and a third program, the software program is programmed in an interpreter-based language, the software program incorporates a software library, wherein the first program is attached to one or more entry points of functions of the software library, wherein the second program to one or more exit points of the functions of the software library, wherein the third program is attached to system call invocations by the software program, wherein at least one of the first program, the second program and the third program is implemented using an extended Berkeley Packet Filter (eBPF); receiving, by a monitoring agent, indications of entries and exits to the functions, the monitoring agent is executed in a second process, the second process having a separate processing space than the first process; based on the indications of entries and exits, monitoring, by the monitoring agent, a stack trace of the software program, whereby tracking stack state in the separate processing space; based on the indications of system call invocations and based on the stack trace of the software program, identifying, by the monitoring agent, system call invocations by the software library; and performing responsive action in response to a determination that a system call invocation deviates from a pre-defined policy of authorized functionalities.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
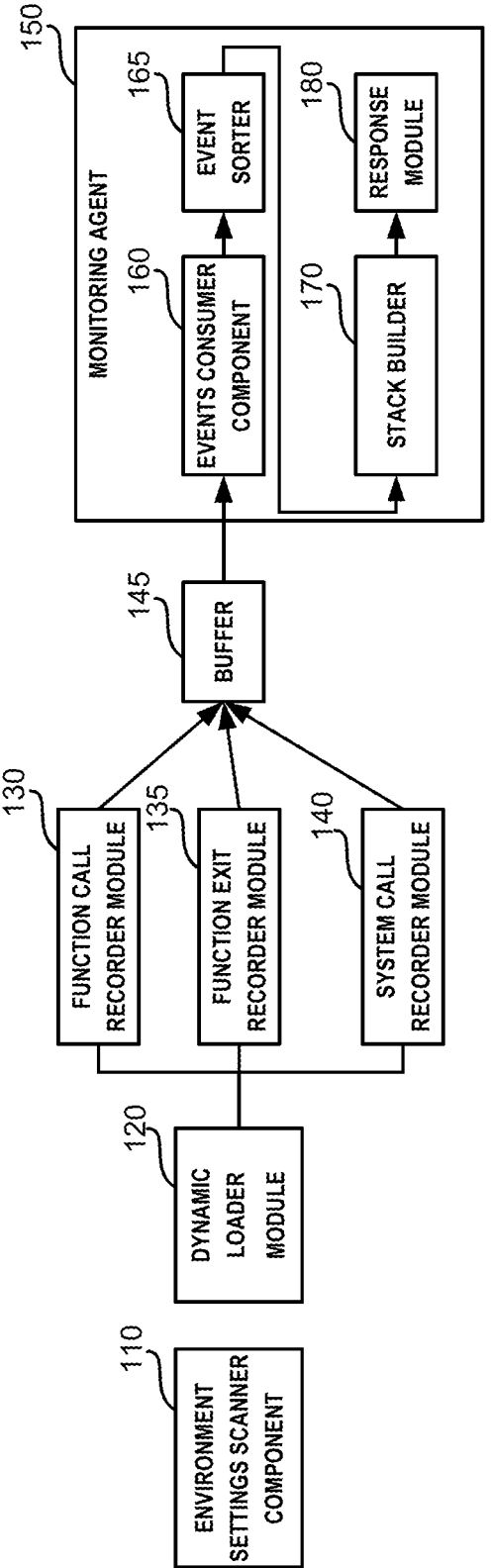
FIG. 1 show an illustration of a system, in accordance with some exemplary embodiments of the disclosed subject matter.

One technical problem dealt with by the present disclosure is the ability to monitor dynamically executed software programs against cybersecurity threats. Specifically, one goal of the disclosed subject matter is to enable protection against complicated attack scenarios without suffering from a high rate of false positive indications or adversely affecting the system's stability.

It may be desired to provide a solution that would be programming-language agnostic. In some exemplary embodiments, it may be desired to provide a solution that is applicable to compiled languages (e.g., Java, C, C #, Kotlin, or the like). Additionally, or alternatively, it may be desired to provide a solution that is applicable to interpreter-based programming languages (e.g., Python, Perl, PHP, MATLAB, JavaScript). An interpreter-based language is characterized in having a different software component—the interpreter— parse and execute the instructions at runtime. The interpreter should not be confused with a virtual machine that executes intermediate code compiled from the software program, such as the case with Java language, in which the program is compiled into bytecode that is then executed on a Java Virtual Machine. In some cases, it may be desired to provide a programming language-agnostic solution.

Another technical problem may be to efficiently monitor an executed software program, without compromising the stability of the executed software program. In a naïve solution, monitoring code may be injected into the binary of the software program. However, in case the monitoring code fails, the entire process may collapse and the software program will shut down as well. Furthermore, in such a naïve solution, multiple duplicate monitoring codes are introduced into a single system, each monitoring activity of different target software programs in a manner that is potentially resource-wasteful.

A naïve solution may focus on protecting the entire software program, e.g. an entire application or an entire container. This creates major challenges since each software program potentially performs a huge variety of actions and events. For example, a single application may need to access the filesystem, the network, execute processes, etc. Therefore, if the naïve solution is aimed at identifying non-trivial attack vectors, machine learning, and heuristics may be utilized to identify abnormalities that potentially represent non-trivial attack vectors. However, this has the potential of creating many false positives and accompanying alert fatigue, or adversely affecting the stability of the system, e.g., crashing the production environment.

Another technical problem may be to enable monitoring and protection against unauthorized usage of system resources, without modifying the protected software program or kernel of the operating system, while still enabling observability of information available only in kernel mode. It may be desired to provide a solution that is deployed at runtime.

One technical solution may be to dynamically attach to a target software program being protected, code that is useful for tracking the state of the software program. In some cases, the added code may be implemented using technologies such as extended Berkeley Packet Filter (eBPF), that enable execution of the added code in a sandboxed environment. Information that is tracked may be conveyed or otherwise provided to a monitoring agent that is executed in a separate processing space from that of the target software.

In some cases, the attached code may be used to track the entry and exit points of functions of the target software program. In some cases, tracking may be performed on all functions in the target software program or on some of them, such as functions of third-party software libraries. By tracking the entry and exit points of functions, a stack trace of the monitoring functions may be built, as at any point it may be known which functions were entered and not yet exited. This information may be used to build a stack trace of the target software program. In some cases, the stack trace may be built in a separate processing space, e.g., by the monitoring agent. In some cases, the stack trace may be built even if the software program is programmed in a language that does not provide an explicit stack or access thereto. Additionally, or alternatively, the stack trace may be created for programs programmed in interpreter-based programming languages and executed by interpreters.

In some exemplary embodiments, system call invocations may be tracked and mapped to the stack trace to determine which function/library within the software program has invoked the system call. In some cases, if while the program is located directly within the library function, i.e., the library function is the last function in the stack trace, the system call is invoked, it may be considered that the library function invoked the system call. In some cases, if only functions of interest are tracked, the partial stack trace that is created can be used to identify the last function which was entered and which was not yet exited before the system call was invoked. In other cases, if additional functions or even if all functions are tracked, the stack trace that is created may include additional intermediate functions. For example, a library function LibFunc may not be allowed to perform network communications. The stack trace may include a sequence of functions, for example, main, f1, f2, LibFunc, f3, f4, indicating that the main function called f1, which called f2, which called LibFunc, which called f3, which called f4. If f4 invokes a system call that relates to network activity, such as for example, socket, connect, listen, or the like, then it may be considered that LibFunc violated its respective policy. In some cases, the function may be considered to violate a policy if the stack trace does not include any additional library function after the relevant function and before the system call was invoked. Additionally, or alternatively, some library functions, such as standard libraries of the relevant programming language, may be ignored in such an analysis (and in some cases, their entry and exit points may not be monitored). Additionally, or alternatively, user functions may be invoked by the library function, such as in case of invocation of callback functions. Such user functions that are intermediate between the system call invocation and the library function may be considered as cutting the connection between the invoked system call and the library function. It is noted that other rules may be applied to determine if a library function that is included in the stack trace is considered connected to the invocation of the system call.

In some exemplary embodiments, a pre-defined policy of authorized functionalities of the software library may be obtained. The pre-defined policy may be hand-defined by a user, may be defined based on analysis of the code of the library functions (e.g., static analysis of code that can invoke a system call), based on dynamic analysis of executions of the library functions (e.g., analysis of actual invocations of system calls, such as during testing or other benign executions), or the like. It is noted that the policy may be provided in a library-granularity (i.e., identical permissions to all functions of the library, even if some of the functions may not invoke in their standard operation all the relevant functionalities) or in a function-granularity (i.e., different permissions to each function in the library). In some exemplary embodiments, library-granularity may be based on analysis of fewer executions than function-granularity, as extracting insights regarding the functionality of each function from executions may require several executions of the same function in different scenarios. As the number of functions may be larger by an order of magnitude (or more) than the number of libraries, this may mean that library-granularity may be obtained using a significantly reduced amount of data and such analysis may require a significantly reduced amount of time, CPU and memory resources. In some cases, library-granularity may be sufficient as the software library may be a logical unit that, as a rule of thumb, should have similar permissions for all relevant sub-modules (e.g., functions) thereof. This is as opposed to its functions, which may have different functionalities, and accordingly, some may require permissions to use OS resources, while others may not. In some exemplary embodiments, library-granularity may be more convenient for a human user to grasp the vulnerabilities and may reduce fatigue caused by excessive duplicative information. It is noted that in some cases, while the general granularity of the policy may be library-granularity, there may be exceptional functions that may be treated differently, due to them being more susceptible to attacks. For example, in parser libraries, the "load" function may be considered as a more likely target for an attack, and therefore it may be associated with separate permissions from the other functions of the same library. In some exemplary embodiments, the permission may indicate which resources can be utilized, such as for example, network activity (e.g., permission to invoke socket, connect, listen, or the like), code execution (e.g., permission to invoke clone, execve, execveat, or the like), filesystem access (e.g., permission to invoke chown, stat, chmod, or the like; permission to read, permission to write, permission to delete or the like), or the like. In some cases, the permissions may be in a lower-granularity and relate to specific system calls. In some exemplary embodiments, the permission may indicate a condition on the stack trace for permitting the invocation. The condition on the stack trace may be, for example, a specific order of function executions in which the invocation is permitted. Another example of a condition on the stack trace may be a suffix of the last n functions in the stack trace. Yet another example of a condition on the stack trace may be that the stack trace includes a set of additional functions (e.g., without necessarily explicitly indicating the entire stack trace, the specific order therebetween, or the like).

In some exemplary embodiments, in response to a deviation from the pre-defined policy, responsive action may be performed. In some cases, the responsive action may be aimed at providing information to a user, such as an administrator, an owner of the software program, or the like. For example, the event may be logged for future reference. In some cases, an immediate alert may be issued. Additionally, or alternatively, the user may review a dashboard showing all, or some of, the libraries/functions in the software program and indicating for each library/function which threats are associated therewith. In some cases, the responsive action may be aimed at protecting the software program, the OS, or other related resources or entities from potential malicious activity. In some exemplary embodiments, the responsive action may prevent the system call from being executed. In some cases, a null response may be provided in response, enabling the software program to handle the response without crushing.

In some exemplary embodiments, the disclosed subject matter may perform a seamless and dynamic runtime micro-segmentation of software programs into libraries, such as modules, methods, functions, or any other computer program artifacts or a portion thereof. Instead of tackling the problem of identifying anomalies in complex software programs, anomalies in simpler artifacts are identified. As a result, the problem is potentially broken into multiple easier subproblems. The role of each library inside the software program may potentially be more structured and defined, compared to the software program, allowing the creation of a deterministic policy based on a profile of activity for each library. For example, as opposed to the problem of a software program requiring different permissions to perform its functionality, e.g., access permission to the filesystem, the network, to process execution, or the like, each library may require much more limited permissions. As an example, a parser library will generally only need access to the filesystem, a camera library will require access to an I/O module of a certain type but do not need to access the network, and a network module may require network permissions but may not need to access the filesystem or other I/O modules.

Performing the micro-segmentation during runtime is a difficult task in general. The task is even more so difficult, when the executed code is not altered. In some cases, some advantages may be achieved by changing the code, re-compiling it, and executing the modified software program. However, such a solution may have many disadvantages. When tackling the problem in an interpreter-based programming language, there is an additional technical challenge, as no explicit stack trace of the interpreter-based code is available. In some cases, the kernel may only be aware of the interpreter stack trace, and not of the higher-level language stack trace.

The disclosed subject matter may provide a solution enabling to dynamically micro-segment both higher-level software programs and lower-level software programs, with a relatively low-performance overhead. It is noted that high overhead, such as may be the case if Runtime Application Self Protection (RASP) methodology is used, may render a solution unpractical.

In some exemplary embodiments, the disclosed subject matter may be implemented for high-level programming languages, and specifically high-level interpreter-based programming languages. Additionally, or alternatively, the disclosed subject matter may be implemented in a fully automated manner, without requiring manual code changes, rerunning the code, or the like.

In some exemplary embodiments, the disclosed subject matter utilizes eBPF technology to execute sandboxed software programs in an operating system kernel. eBPF may provide a safe and efficient manner of extending the capabilities of the kernel without requiring changing kernel source code or load kernel modules. Using eBPF, the disclosed subject matter may extend the kernel functionality to re-create the function stack of the software program, or some derivative thereof (e.g., relating to a sub-portion of the functions).

In some cases, if the tracking is being performed in a different sandboxed environment, in such an environment the memory of the software program is not accessible and therefore the tracking code may be unable to gain access to the function stack.

For interpreter-based programming languages, the software program may be executed by an interpreter. It is noted that while the interpreter may create a function stack internally and keep a tab on its state, such information may not be exported to external applications by the interpreter, may not be accessible to the kernel, or otherwise be provided via an Application Programming Interface (API).

In some exemplary embodiments, the disclosed subject matter may seamlessly create the higher-level stack on-the-fly and make the kernel aware of the libraries that caused the kernel events. In some exemplary embodiments, user-level probes may be used in order to hook into the relevant entry and exit points, and kernel-level probes in order to hook the relevant kernel events. It is noted that in some cases, some hooks may be implemented using eBPF while others may be implemented using other methods and technologies. For example, it may be desired to reduce the performance overhead caused by excessive switching from user mode to kernel mode and vice versa. As an example, tracking functionality that is implemented in user mode may be performed at the user mode level to avoid switching to kernel mode and switching back to user mode. In some cases, a selective determination may be implemented to decide for which hooks to switch to kernel mode (e.g., using eBPF) and in which hooks to refrain from such switch and remain in user mode (e.g., using non-eBPF function invocations, such as using dynamic instrumentation).

In some exemplary embodiments, profiling of authorized permissions of each library may be performed during a profiling phase. During the profiling phase, the target software program may be executed and each software library's usage of hardware resources (e.g., via system calls) may be tracked and recorded. The target software program may be executed in a manner that is considered benign and in a manner in which the software program is intended to be executed. Put differently, the profiling may monitor the "normal" behavior of the software program. Using the gathered information, a policy for each software library may be defined, so as to be in accordance with relevant functionality profile. The policy may be enforced during an enforcement phase. During the enforcement phase, the software program may be executed and the policy may be enforced to detect and potentially prevent a library from performing a system call that is not authorized according to its associated policy.

In some exemplary embodiments, each kernel may be augmented by a single monitoring agent, in accordance with the disclosed subject matter. For example, in a container orchestration system (e.g., Kubernetes™ environment), a single agent may be deployed at each host computer (e.g., also referred to as "host" or "node") that executes a single OS. The single agent may be deployed in a container, while other containers may execute other software programs that are monitored thereby. Such a configuration may be relatively more efficient and have reduced overhead compared to a configuration in which each container is monitored by a different agent.

The monitoring agent may set up the monitoring programs, so that such programs are executed at the desired time to monitor events of interest. In some exemplary embodiments, some or all of the monitoring programs may be implemented using eBPF programs. The monitoring programs may include a function recorder program, configured to record function invocations and exit events in the interpreter-based code. Additionally, or alternatively, the monitoring programs may include a syscall recorder program configured to record each invocation of a system call.

In some exemplary embodiments, the monitoring agent may be configured to obtain the recorded information and re-create the interpreter-based language stack. Using the re-created stack, each system call may be attributed to a specific library in the interpreter-based code. Using such information, a profile may be generated after the profiling phase. Additionally, or alternatively, using such information, deviation from a given profile of a library may be detected during execution and an appropriate responsive action may be implemented to mitigate the potential exposure.

One technical effect of the disclosed subject matter may include the re-creation of a stack trace in a separate processing space. The stack trace may be re-created in a language-agnostic manner, and without relying on a specific programming language. In some cases, a single monitoring agent may be utilized to track stack traces of different programs simultaneously, each of which may be implemented in a different programming language.

Another technical effect may be to provide a simple and straightforward policy for enforcement, which may not require extensive processing power to implement, as opposed to AI-based analysis aimed at identifying complicated attack scenarios. The simple policy may be useful in reducing false positive indications, and as a result, reducing alert fatigue of users.

Yet another technical effect may be to provide monitoring capabilities with a relatively low-overhead, making the solution into a practical solution for real-life scenarios. Low-overhead may be achieved by implementing a single-to-many architecture, by implementing selective kernel mode switching, by utilizing efficient manners of observing kernel mode information, or the like.

Yet another technical effect may be to provide monitoring capabilities adversely affecting the stability of the monitored system. As the monitoring agent is executed in a separate processing space, even if the monitoring agent crashes, the software program remains unaffected and can continue its routine operation.

The disclosed subject matter may provide for one or more technical improvements over any pre-existing technique and any technique that has previously become routine or conventional in the art. Additional technical problems, solutions, and effects may be apparent to a person of ordinary skill in the art in view of the present disclosure.

Referring now to FIG. 1, showing an illustration of a system in accordance with the disclosed subject matter.

In some exemplary embodiments, an Environment Settings Scanner Component 110 is configured to scan the environment metadata of the executing environment, such as, for example, versions of the interpreters installed on the host machine, OS version of the host machine, third-party libraries installed on containers, host architecture, container id, container name, uptime, node name in a container orchestration system (e.g., KUBERNETES™), namespace in the container orchestration system, cluster id in the container orchestration system, and the like. Different environment settings may be translated into a different implementation of the same functionality. For example, each host machine may have different versions of interpreters (e.g., for the same interpreter-based programming language) and different hooking may be implemented for the different versions.

In some exemplary embodiments, a Dynamic Loader Module 120 may be configured to attach one or more monitoring programs, such as Function Call Recorder Module 130, Function Exit Recorder Module 135, System Call Recorder Module 140, or the like, to the correct hooks. Dynamic Loader Module 120 may be configured to attach the monitoring programs to a target software program (not shown) during runtime. In some cases, Dynamic Loader Module 120 may be configured to perform the dynamic attachment of monitoring without having to re-compile the target software program, without modifying the code of the target software program, or the like. In some cases, Dynamic Loader Module 120 may utilize eBPF, and some or all the attached programs may be eBPF programs. In some exemplary embodiments, the monitoring programs may comprise a Function Call Recorder Module 130, Function Exit Recorder Module 135, and a System Call Recorder Module 140. In some cases, Function Call Recorder Module 130 and Function Exit Recorder Module 135 may be referred to as "function recorder modules". It is noted that in some cases Function Call Recorder Module 130 and Function Exit Recorder Module 135 may be executed in the same OS mode (e.g., user mode or kernel mode), while System Call Recorder Module 140 may be executed in a different OS mode. For example, Function Call Recorder Module 130 and Function Exit Recorder Module 135 may be both executed in user mode and without switching to kernel mode, while System Call Recorder Module 140 may be executed in kernel mode.

Dynamic Loader Module 120 may be executed upon deployment of the host, each time the host is booted, or the like. It is noted that the disclosed subject matter is not limited to deployment of the monitoring programs at a specific time, and the Dynamic Loader Module 120 may be invoked even after the host is already up and running, enabling monitoring on-the-fly of events that occur after the monitoring programs (e.g., eBPF programs) are attached to their respective hooks.

In some exemplary embodiments, Function Call Recorder Module 130 may be one or more monitoring programs that are dynamically hooked to the executed binary (e.g., the executed binary of the software program, the interpreter executing the software program, or the like), in the position that is responsible for methods and functions invocations.

In some exemplary embodiments, Function Call Recorder Module 130 may be implemented using uprobe. uprobe may be user-level dynamic function instrumentation. In some exemplary embodiments, uprobe may be a LINUX™ kernel technology for providing dynamic tracing of user-level functions. uprobe may allow to dynamically instrument user applications, injecting programmable breakpoints at arbitrary instructions. In some exemplary embodiments, uprobe may allow catching the entry for each function. Each time a function is called and its entry point is reached, Function Call Recorder Module 130 may be invoked, and the metadata relating to the invoked function may be logged, potentially together with a timestamp. The metadata may include, for example, the name of the function, the filename, the class, the arguments passed to the function, or the like.

In some exemplary embodiments, Function Exit Recorder Module 135 may be implemented using uretprobe. uretprobe may be user-level dynamic function return instrumentation that is invoked on the function's return event (also referred to as "exit event"). In some exemplary embodiments, uretprobe may be utilized to catch the return events of every invoked function. Each time a return event occurs, Function Exit Recorder Module 135 may be invoked, and the metadata relating to the function from which the return occurred may be logged, potentially together with a timestamp.

In some exemplary embodiments, Function Call Recorder Module 130 and Function Exit Recorder Module 135 may be executed as eBPF programs that extract the function and filename of each executed function and logs it to Buffer 145. Buffer 145 may be, for example, ring buffer, perf buffer, or the like. It is noted that Buffer 145 may be a circular buffer that allows exchanging data between kernel and user-space. In some exemplary embodiments, perf buffer may cause some event re-ordering which may require sorting of the events according to recorded timestamps. Additionally, or alternatively, a ring buffer may be a Multi-Producer, Single-Consumer (MPSC) queue and can be safely shared across multiple CPUs simultaneously without causing event shuffling.

In some exemplary embodiments, System Call Recorder Module 140 may be dynamically hooked to raw_tracepoint of all system calls. This monitoring program may be invoked for each system call entry, and it may write to a buffer the names and arguments of each syscall of the target application, together with the timestamp. In some cases, only some system call types may be monitored. For example, a user may decide to track only system calls related to network activity and not system calls related to storage access.

In some exemplary embodiments, Monitoring Agent 150 may comprise an Events Consumer Component 160, Event Sorter 165, Stack Builder 170, and a Response Module 180. Monitoring Agent 150 may be executed in a separate execution environment from the target software program. It is noted that in some cases, Monitoring Agent 150 may comprise Environment Settings Scanner Component 110 and Dynamic Loader Module 120. In other cases, such components may be executed separately than Monitoring Agent 150.

In some exemplary embodiments, Events Consumer Component 160 may be configured to read all the events from the buffer, which are generated by the monitoring programs (e.g., Function Call Recorder Module 130, Function Exit Recorder Module 135, System Call Recorder Module 140). In cases where event shuffling may occur, an Event Sorter 165 may be utilized to order the events according to their logged timestamps.

A Stack Builder 170 may be configured to build the stack trace that led to each system call. In some cases, Stack Builder 170 may re-create an identical copy of the true stack trace of the software program. In some cases, only a subset of the functions is monitored using Function Call Recorder Module 130 and Function Exit Recorder Module 135. In such a case, the built stack trace may be a partial stack trace and not an identical copy thereof. For example, standard libraries may be ignored and not logged. As another example, in some cases, only some libraries may be tracked, such as only third-party libraries, only open-source libraries, only a subset of libraries selected by the user, or the like.

In some exemplary embodiments, the stack trace may be created based on the correctly ordered list of events, indicating which function was called prior to the system call invocation and which has not yet ended. The built stack trace may be utilized to identify which libraries have caused the system call, and not necessarily only which function directly invoked the system call. Based on such information, a profile can be created during the profiling phase, which can be used to define a pre-defined policy. The pre-defined policy may define a policy of authorized invocations of specific system calls or groups thereof, based on a stack trace condition. Additionally, or alternatively, during the enforcement phase, based on the built stack trace, the activity may be compared with the pre-defined policy.

Response Module 180 may be configured to implement a responsive action in response to a determination that the system call was called in a deviation from the pre-defined policy associated with the calling function or the calling library. The responsive action may be aimed at mitigating risk from such unauthorized activity. In some cases, the responsive action may be to prevent the execution of the system call. Additionally, or alternatively, the responsive action may be aimed at informing relevant users, such as IT users, owners of the software program, developers, or the like, of the deviation from the policy. In some cases, the responsive action may be to log information in a persistent log file. The log file may be used by users for manual review, may be the basis of dashboard information presented to users, or the like. In some cases, the responsive action may be to alert the user, such as by sending the user an immediate notification, a text message, an email, a popup message, or the like.

Figure 2:
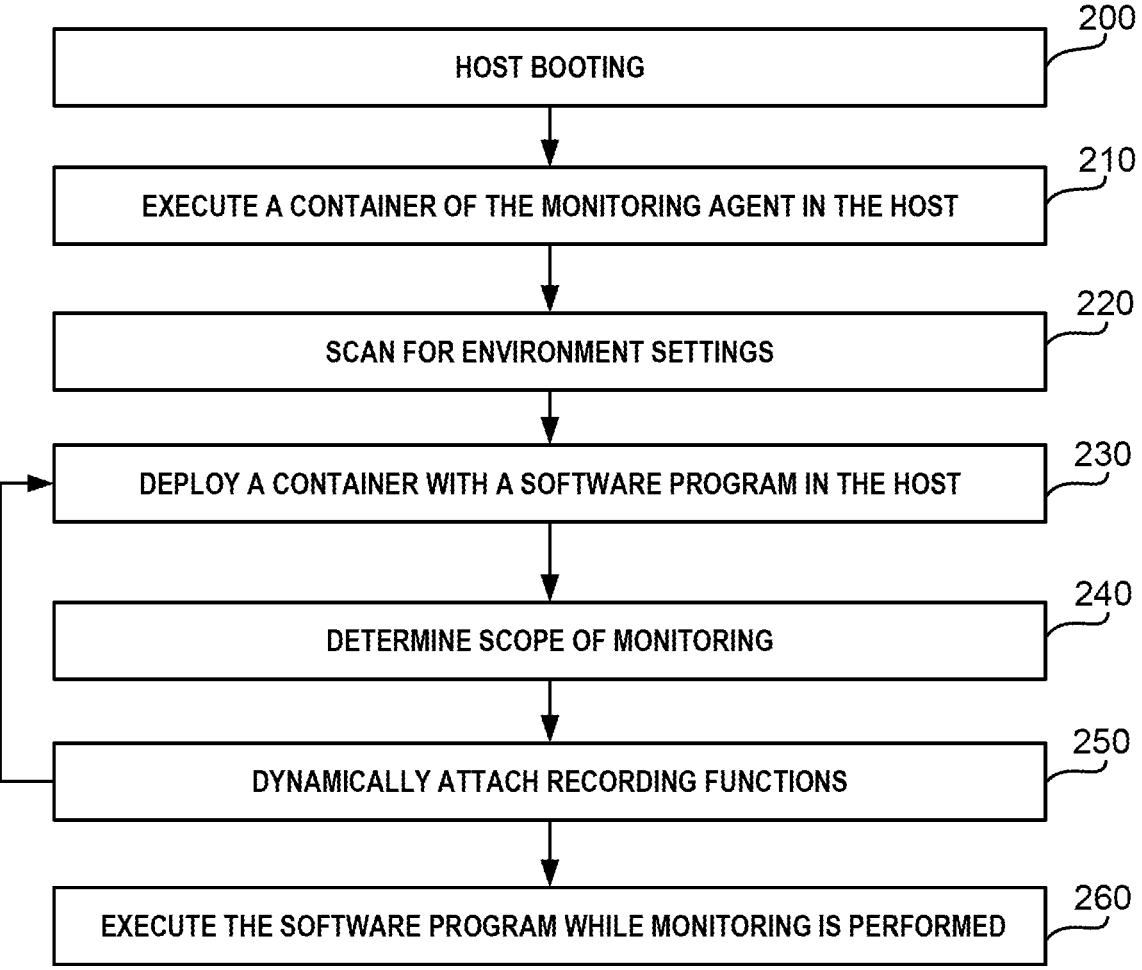
FIG. 2 shows an exemplary flowchart diagram of a method, in accordance with some exemplary embodiments of the disclosed subject matter.

Referring now to FIG. 2, showing a flowchart diagram of a method, in accordance with some exemplary embodiments of the disclosed subject matter.

On Step 200, a host computer boots and initializes. The host computer may be a standalone computer, a node in a computer cluster, a node in a container orchestration system, or the like. For ease of explanation, the description focuses, without narrowing the scope of the subject matter, on an embodiment in which the host is capable of providing distinct processing spaces for executing different programs. In some cases, a container may be a lightweight and portable software package that contains the necessary components to run a software program, such as the application code, libraries, system tools, an interpreter, or the like. Containers may allow developers to package their application code and dependencies together, which makes it easier to deploy and run the application consistently across different environ- ments.

On Step 210, after the host computer is operational, a container that includes the monitoring agent (e.g., 150 of FIG. 1) may be deployed in the host computer. As a result, the monitoring agent may be executed by the host computer.

On Step 220, scanning environment settings may be performed, such as using Environment Settings Scanner Component 110 of FIG. 1.

On Step 230, a container with a software program is deployed. In some cases, the software program may include, directly or indirectly, a software library. The software library may be a third-party library, such as an open-source library, a proprietary library provided by a vendor, or the like. The software library may provide for pre-defined functionalities and may be incorporated into the software program, so as to allow the software program to utilize the pre-defined func- tionalities.

On Step 240, a scope of monitoring may be determined. The scope of monitoring may depend on the environment settings, the available resources, the anticipated overhead from monitoring, or the like. In some cases, different moni- toring scopes may be determined in view of different usages. For example, in a profiling phase, it may not be necessary to monitor in real-time all system call invocations. A statisti- cally representative sample may be sufficient to enable extraction of the execution profile of the software program and/or library incorporated therein. As another example, in an enforcement phase, each invocation of a system call should be monitored in real time to enable real-time pre- vention of malicious activity. If instead of prevention, it is desired to log information and provide analytic data to the user, different monitoring scope may be determined. In some cases, monitoring scopes may differ in any one or more of the following aspects: a manner of attaching the recording function, whether monitoring of functions entry and exit points is performed in kernel mode or in user mode, which functions are monitored (e.g., all functions, all functions of one or more libraries, some specific functions, which func- tions are ignored (e.g., in view of a white list), or the like), whether monitoring of system call invocations is performed in kernel mode or in user mode, which system calls are monitored (e.g., all system calls, all system calls of a specific category, or subset of relevant system calls that access secure assets of the operating system, or the like), how the recorded information is passed to the monitoring agent (e.g., which type of buffer is used, the size of the buffer, or the like) or the like.

On Step 250, recording functions are dynamically attached to the executed software program, thereby imple- menting the scope of monitoring that was determined on Step 240. In some cases, eBPF may be utilized for dynami- cally attaching a recording function that is to implement kernel mode monitoring.

On Step 260, the software program is being executed. During the execution of the software program, the recording functions are invoked, and the operation of the software program is accordingly monitored. The monitoring agent may act upon the monitored information.

Figure 3A:
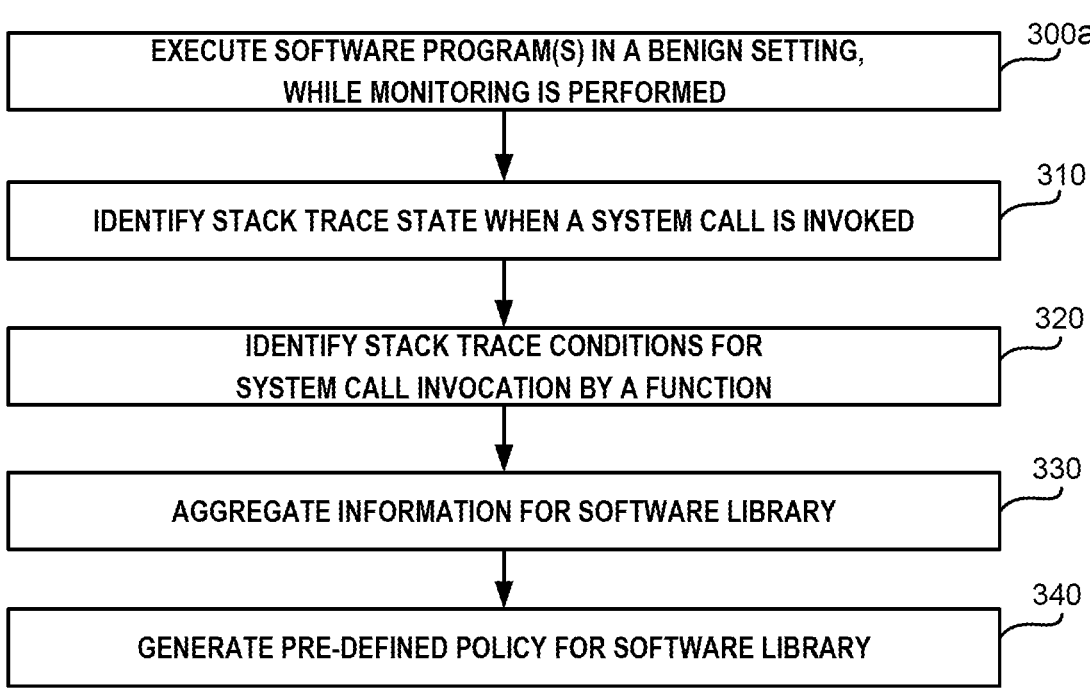
FIGS. 3A and 3B show exemplary flowchart diagrams of methods, in accordance with some exemplary embodiments of the disclosed subject matter.

Referring now to FIG. 3A showing a flowchart diagram of a method, in accordance with some exemplary embodiments of the disclosed subject matter. FIG. 3A is illustrative of a method performed in a profiling phase.

On Step 300a, one or more software programs are executed under benign settings, while being monitored. For example, the monitoring may be implemented as indicated in FIG. 2. However, the profiling may also be implemented using other methods. In some cases, profiling may be performed with respect to a specific software library. In such a case, the profiling may be based on execution of a plurality of software programs that utilize the software library of interest. The execution is performed in non-malicious man- ner, attempting to provide a large coverage (e.g., coverage metric over a threshold) of the normal operation of the software library. During the profiling phase, it may be desired to identify the expected behavior of the software library and not to include exploitation of potential vulner- abilities therein. In some cases, unit testing, regression testing, or the like, may be useful test cases that can be considered "benign settings", which should present the authorized activity of the software program. In some cases, an execution of a test may be considered "benign" only if the test was successful. In the event the test fails, for any reason, the outcome of the monitored of such execution may be ignored to avoid introducing unauthorized functionality that may be exhibited as part of an exploit of a vulnerability.

On Step 310, a state of a stack trace may be determined with respect to an invocation of a system call that was caused by the software library (e.g., a function of the software library had caused, directly or indirectly, the sys- tem call to be invoked).

On Step 320, based on multiple stack traces states iden- tified in Step 310, stack trace conditions for system call invocations by a function may be determined. On one hand, the stack trace conditions may be as simple as the function or a function of the library is included in the stack trace, is included as one of the last N calling functions in the stack trace, or the like. On the other hand, more complicated conditions may be identified, such as conditions that relate to multiple different functions, order of invocations therebe- tween, or the like. For example, a more complicated stack trace condition may be determined based on determining that function F1 may invoke system call SC only if F1 was invoked by F2.

In some cases, by working at a library-granularity, a reduced amount of data may be sufficient to extract useful insights, as library-level insights, irrespective of a specific function, may be sufficient. For example, consider function RareFunc which is rarely invoked, e.g., once every 1 million usages of the software library. In order to obtain sufficient information about the activity profile of RareFunc, billions of executions of the software library may be needed, as they would include thousands of executions of RareFunc. How- ever, when working at a library-granularity, it may be assumed that the permissions of RareFunc should be similar to those of CommonFunc of the same library. If one function of the library is allowed to perform an action, then the library will have such permissions and all functions of the library would also be allowed to perform the same function. Hence, based on a million of executions of the software library, sufficient information may be extracted with respect to the software library as a whole. Accordingly, the resources (e.g., CPU, memory, time, or the like) required for the profiling phase may be lower by at least one order of magnitude.

On Step 330, the information obtained about the different functions may be aggregated to a library level.

On Step 340, based on the aggregated information, pre- defined policy for the software library may be determined. The policy may include stack trace conditions in which specific system calls, or specific types of system calls, can be invoked by functions of the software library.

In some exemplary embodiments, a variation of FIG. 3A may be implemented with respect to a specific target function, instead of a target software library, in case it is desired to determine an activity profile and a policy at a function-granularity instead of at a library-granularity. It is noted that while such analysis may be more resource intensive, the profile it yields may be more accurate than the one determined at the library-granularity.

Figure 3B:
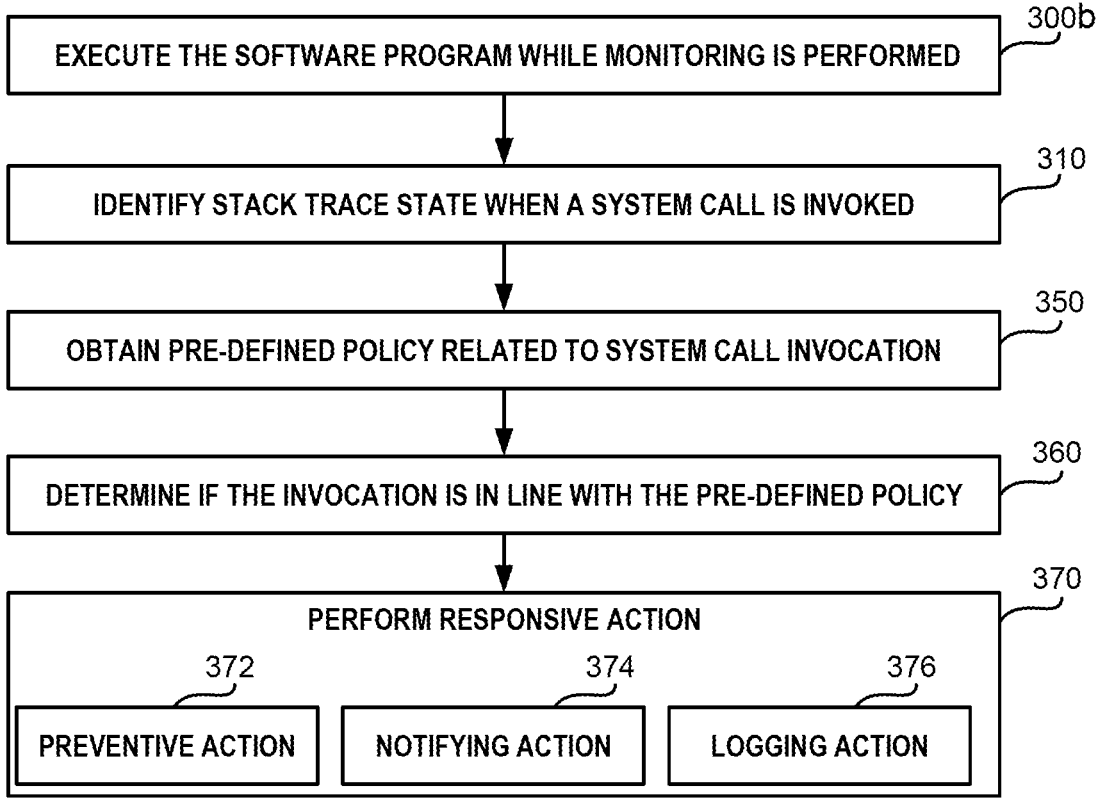

Referring now to FIG. 3B showing a flowchart diagram of a method, in accordance with some exemplary embodiments of the disclosed subject matter. FIG. 3B may illustrate the enforcement phase.

On Step 300*b*, the software program is executed, e.g., using a container. The software program may be monitored, such as using the techniques disclosed in the present application. It is noted that the execution may not necessarily be benign. Instead, the disclosed subject matter may be aimed at identifying and potentially even preventing malicious activity or other unauthorized operation that deviates from the regular profile of the library/function, as reflect in the benign executions.

On Step 350, a pre-defined policy related to an invoked system call is obtained. The pre-defined policy may be a policy generated at Step 340 of FIG. 3A. On Step 360, it may be determined whether the invocation is in line with the pre-defined policy or deviates therefrom. In some cases, several different policies may be obtained and all of which should be upheld (i.e., in such an embodiment, it may be sufficient for one policy to be violated to determine that the execution is problematic). In some cases, a deviation from the pre-defined policy may include the invocation of a system call that the pre-defined policy of the function does not allow (in any circumstance). Additionally, or alternatively, a deviation from the pre-defined policy may include the invocation of a system call that the pre-defined policy of the software library does not allow (in any circumstance). Additionally, or alternatively, a deviation from the pre-defined policy may include the invocation of a system call when a stack trace condition is violated. In some cases, it may be sufficient for one stack trace condition to be held in order for the invocation to be considered in line with the pre-defined policy. In other cases, multiple stack trace conditions may be conjunctive, and all stack trace conditions relating to a specific system call (or a specific type of system call) may need to be held in order for the invocation to be considered in line with the policy and not in deviation therefrom.

On Step 370, a responsive action may be performed. The responsive action may be performed in the enforcement phase, so as to prevent from the library/function to access an unauthorized resource. A preventive action (372) may, for example, intercept the system call and prevent the system call from being processed by the OS itself. In some cases, in order for the preventive action to be performed, the monitoring and the responsive action must be performed in real-time, such as within a limited timeframe, of no more than 100 ms, 200 ms, 500 ms, or the like, from the attempted invocation.

Additionally, or alternatively, the responsive action may be aimed at notifying a relevant user, such as an IT manager, a cybersecurity professional, an administrator, or the like. A notifying action (374) may include real-time or near-real-time notification, such as using an SMS message, a popup, a push notification, an email, or the like.

Additionally, or alternatively, the responsive action may be aimed at retaining information to be used in the future. A logging action (376) may log the identified event. The log may be used later on for data analysis, and a dashboard may be presented to a user, such as an IT manager, a cybersecurity professional, an administrator, or the like. The dashboard may indicate which libraries/functions deployed as part of the software program had exhibited unauthorized activity, and which kind. For example, consider a library that has permission to perform system calls of type "code execution", but not of type "file access" or "network access". If a system call related to network access (e.g., "socket") is invoked by such library, the dashboard may present to the user that the library has permission to perform "code execution" and also attempts to perform the unauthorized "network access". The user may review the information and consider how to respond. For example, the user may update the library to a newer version; the user may replace the library by another library; the user may determine that the library acts properly and update the policy to include the additional invocation as permissible (e.g., in general, or under certain stack trace conditions), or the like.

Figure 4:
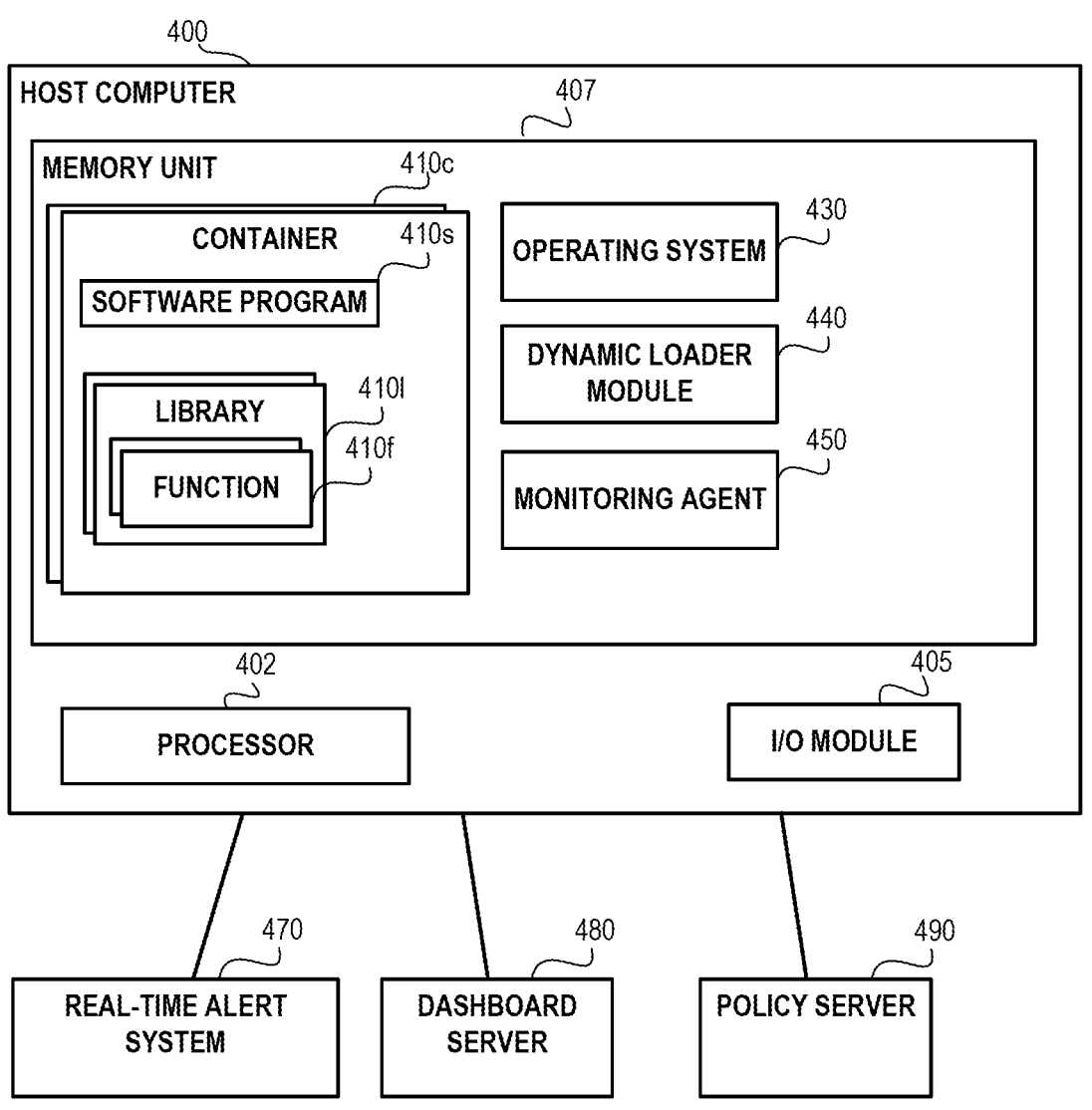
FIG. 4 shows a block diagram of a system, in accordance with some exemplary embodiments of the disclosed subject matter.

FIG. 4 shows a block diagram of a system, in accordance with some exemplary embodiments of the disclosed subject matter.

Host Computer 400 may be a node of a container orchestration system, capable of dynamically deploying containers, such as 410*c*, that are used to execute programs.

In some exemplary embodiments, Host Computer 400 may comprise a Processor 402. Processor 402 may be a Central Processing Unit (CPU), a microprocessor, an electronic circuit, an Integrated Circuit (IC), or the like. Processor 402 may be utilized to perform computations required by Host Computer 400 or any of its subcomponents. Processor 402 may be configured to execute computer programs useful in performing the methods of FIGS. 2, 3A, 3B, or the like.

In some exemplary embodiments of the disclosed subject matter, an Input/Output (I/O) Module 405 may be utilized to provide an output to and receive input from a user such as via user interactions. I/O Module 405 may be used to transmit and receive information to and from the user or any other apparatus.

In some exemplary embodiments, Host Computer 400 may comprise a Memory Unit 407. Memory Unit 407 may be a short-term storage device or a long-term storage device. Memory Unit 407 may be a persistent storage or volatile storage. Memory Unit 407 may be a disk drive, a Flash disk, a Random Access Memory (RAM), a memory chip, or the like. In some exemplary embodiments, Memory Unit 407 may retain program code operative to cause Processor 402 to perform acts associated with any of the subcomponents of Host Computer 400.

In some exemplary embodiments, Host Computer 400 may have an Operating System 430. Operating System 430 may be configured to provide access to OS resources, such as but not limited to network connectivity (e.g., via I/O Module 405), access to the file system (e.g., via Memory Unit 407), invoke execution of a new code, or the like. Operating System 430 may utilize two different modes for managing processes: kernel mode and user mode. Kernel mode is a privileged mode that allows the software to access system resources, such as those made available via Memory Unit 407 and I/O Module 405, and perform privileged operations. User mode, on the other hand, is a restricted mode that limits the software's access to system resources. Processor 402 may be configured to switch between these two modes depending on the type of code that is being executed. Applications typically run in user mode, while core operating system components run in kernel mode. When a user-level application needs to perform an operation that requires kernel mode access, it must make a system call to the operating system kernel. The operating system then switches Processor 402 from user mode to kernel mode to execute the system call and switches back to user mode once the operation is complete.

Memory Unit 607 may retain one or more containers (410*c*). Each Container 410*c* includes a Software Program 410*s* and one or more Libraries 4101. Containers provide an isolated environment for running applications and their dependencies, allowing for efficient resource utilization and scalability. By packaging the Software Program 410*s* and its required Libraries 4101 within a Container 410*c*, the application can be easily deployed and managed within the container orchestration system. Each Library 4101 may be composed of multiple Functions (4100. In some cases, there may be hundreds, thousands, or more Functions 410*f* that are implemented by a Library 4101.

Dynamic Loader Module 440 (e.g., 120 of FIG. 1) may be configured to dynamically attach monitoring functions, such as functions that record entry points to functions, exit points from functions and system call invocations. In some cases, Dynamic Loader Module 440 may attach eBPF functions. In other cases, other technologies may be utilized to dynamically deploy and attach on-the-fly code that enables information to be passed to a separate processing space.

Monitoring Agent 450 may be configured to receive information monitored by the monitoring functions. In some cases, Monitoring Agent 450 may be deployed using a container. In some cases, a single Monitoring Agent 450 process/container may be utilized to monitor information received regarding a plurality of deployed containers (410*c*).

In some cases, Monitoring Agent 450 may obtain a pre-defined policy of authorized functionalities. The policy may be associated with a specific Library 4101, with a specific Function 410*f*, or the like. In some cases, the policy may be a general policy for all instances of the Library 4101, Function 410*f*, or the like. In other cases, the policy may be container-specific and relate specifically to Library 4101, Function 410*f*, or the like of the specific associated Container 410*c*. The policy may be retrieved from a server, such as Policy Server 490. Policy Server 490 may prepare in advance pre-defined policies, such as based on analysis of the relevant library, function, container, or the like. In some cases, Policy Server 490 may determine the policy based on static analysis of the relevant code. Additionally, or alternatively, Policy Server 490 may determine the policy based on dynamic analysis, such as based on benign execution of the relevant code and based on a behavior profile derived therefrom.

In some exemplary embodiments, Monitoring Agent 450 may identify deviations from the pre-defined policy. Monitoring Agent 450 may build a stack trace to identify which one or more libraries/functions are responsible for each system call invocation. A policy related to the relevant library/function(s) may be obtained and consulted to determine if the system call invocation is in line with the relevant one or more pre-defined policies. Monitoring Agent 450 may perform responsive action(s) in response to deviations from one or more pre-defined policies. For example, Monitoring Agent 450 may prevent the invocation of system calls in cases where the policy prohibits such activity. As another example, Monitoring Agent 450 may alert a user, such as using Real-Time Alert System 470, of the deviation. As yet another example, relevant information may be logged, enabling Dashboard Server 480 to present visual information to a user, showing which libraries/functions exhibit deviations from their respective policies.

The present invention may be a system, a method, and/or a computer program product. The computer program product may include a computer-readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for monitoring execution of a software program in first process by a host computer, the software program is programmed in an interpreter-based language, the software program incorporates a software library, the host computer is executing an operating system having a kernel and provisioning distinct processing spaces to different executed programs, the method comprising:

attaching a first program to one or more entry points of functions of the software library, a second program to one or more exit points of the functions of the software library and a third program to system call invocations by the software program, wherein at least one of the first program, the second program and the third program is implemented using an extended Berkeley Packet Filter (eBPF), whereby the eBPF providing observability in kernel mode of the operating system, the first program configured to issue indications of entries to functions, the second program configured to issue indications of exits from functions, the third program is configured to issue indications of system call invocations, wherein a portion of the first program, the second program and the third program is implemented without using the eBPF, whereby the portion is used to collect information from user mode, whereby reducing overhead associated with mode switching from kernel mode to user mode or vice versa;

receiving, by a monitoring agent, the indications of entries and the indications of exits, the monitoring agent is executed in a second process of the host computer, the second process having a separate processing space than the first process;

based on the indications of entries and the indications of exits, monitoring, by the monitoring agent, a stack trace of the software program, whereby tracking stack state in the separate processing space;

based on the indications of system call invocations and based on the stack trace of the software program, identifying, by the monitoring agent, system call invocations by the software library; and performing responsive action in response to a determination that a system call invocation deviates from a pre-defined policy of authorized functionalities.

2. The method of claim 1, wherein the monitoring agent and the software program are programmed using different programming languages.

3. The method of claim 1, wherein the host computer is part of a container orchestration system, wherein the first process executing the software program is a first container of the container orchestration system, wherein the second process is a second container of the container orchestration system.

4. The method of claim 3, wherein the host computer executing one or more additional containers, the one or more additional containers are used to execute one or more additional programs, each of the one or more additional programs is attached at runtime with monitoring programs for monitoring entries and exists to functions thereof and to system call invocations therefrom, whereby enabling the monitoring agent to monitor, in a single processing space, a plurality of different stack traces, whereby reducing resource overhead utilized for monitoring stack traces.

5. The method of claim 1, wherein stable execution of the software program is not compromised in an event of unexpected termination of the monitoring agent, whereby robust execution of the software program is provided while enabling stack trace monitoring thereof.

6. The method of claim 1, wherein the responsive action comprises preventing the system call invocation, whereby enforcing the pre-defined policy.

7. The method of claim 1, wherein the responsive action providing a visual display to a user indicating identified security issues associated with a plurality of software libraries including the software library.

8. The method of claim 1, wherein the pre-defined policy is defined in a function-granularity or in a library-granularity.

9. The method of claim 1, wherein the pre-defined policy is defined as allowing or prohibit a function or library to perform any of the following actions:

code execution;

file access; and network access.

10. A computer program product retaining on a computer readable storage medium, program instructions, which instructions when executed by a processor, cause the processor to perform:

attaching to a software program that is executed in a first process, a first program, a second program and a third program, the software program is programmed in an interpreter-based language, the software program incorporates a software library, wherein the first program is attached to one or more entry points of functions of the software library, wherein the second program to one or more exit points of the functions of the software library, wherein the third program is attached to system call invocations by the software program, wherein at least one of the first program, the second program and the third program is implemented using an extended Berkeley Packet Filter (eBPF), the first program configured to issue indications of entries to functions, the second program configured to issue indications of exits from functions, the third program is configured to issue indications of system call invocations, wherein a portion of the first program, the second program and the third program is implemented without using the eBPF, whereby the portion is used to collect information from user mode, whereby reducing overhead associated with mode switching from kernel mode to user mode or vice versa;

receiving, by a monitoring agent, the indications of entries and the indications of exits, the monitoring agent is executed in a second process, the second process having a separate processing space than the first process;

based on the indications of entries and exits, monitoring, by the monitoring agent, a stack trace of the software program, whereby tracking stack state in the separate processing space;

based on the indications of system call invocations and based on the stack trace of the software program, identifying, by the monitoring agent, system call invocations by the software library; and performing responsive action in response to a determination that a system call invocation deviates from a pre-defined policy of authorized functionalities.

11. A system comprising:

a host computer comprising a processor and a memory, a software program is retained on the memory, wherein the software program is programmed in an interpreter-based language, the software program incorporates a software library, the host computer is configured to execute an operating system having a kernel and provisioning distinct processing spaces to different executed programs;

wherein said processor is configured to:

attach a first program to one or more entry points of functions of the software library, a second program to one or more exit points of the functions of the software library and a third program to system call invocations by the software program, wherein at least one of the first program, the second program and the third program is implemented using an extended Berkeley Packet Filter (eBPF), whereby the eBPF providing observability in kernel mode of the operating system, the first program configured to issue indications of entries to functions, the second program configured to issue indications of exits from functions, the third program is configured to issue indications of system call invocations, wherein a portion of the first program, the second program and the third program is implemented without using the eBPF, whereby the portion is used to collect information from user mode, whereby reducing overhead associated with mode switching from kernel mode to user mode or vice versa;

receive, by a monitoring agent, the indications of entries and the indications of exits, the monitoring agent is executed in a second process of the host computer, the second process having a separate processing space than the first process;

based on the indications of entries and the indications of exits, monitor, by the monitoring agent, a stack trace of the software program, whereby tracking stack state in the separate processing space;

based on the indications of system call invocations and based on the stack trace of the software program, identify, by the monitoring agent, system call invocations by the software library; and perform responsive action in response to a determination that a system call invocation deviates from a pre-defined policy of authorized functionalities.

12. The system of claim 11, wherein the monitoring agent and the software program are programmed using different programming languages.

13. The system of claim 11, wherein the host computer is part of a container orchestration system, wherein the first process executing the software program is a first container of the container orchestration system, wherein the second process is a second container of the container orchestration system.

14. The system of claim 13, wherein the host computer executing one or more additional containers, the one or more additional containers are used to execute one or more additional programs, each of the one or more additional programs is attached at runtime with monitoring programs for monitoring entries and exists to functions thereof and to system call invocations therefrom, whereby enabling the monitoring agent to monitor, in a single processing space, a plurality of different stack traces, whereby reducing resource overhead utilized for monitoring stack traces.

15. The system of claim 11, wherein stable execution of the software program is not compromised in an event of unexpected termination of the monitoring agent, whereby robust execution of the software program is provided while enabling stack trace monitoring thereof.

16. The system of claim 11, wherein the responsive action comprises preventing the system call invocation, whereby enforcing the pre-defined policy.

17. The system of claim 11, wherein the responsive action providing a visual display to a user indicating identified security issues associated with a plurality of software libraries including the software library.

18. The system of claim 11, wherein the pre-defined policy is defined in a function-granularity or in a library-granularity.

19. The system of claim 11, wherein the pre-defined policy is defined as allowing or prohibit a function or library to perform any of the following actions:
 code execution;
 file access; and
 network access.

\* \* \* \* \*